(No Model.)

G. W. WARREN.
VEHICLE SPRING.

No. 304,150.  Patented Aug. 26, 1884.

Witnesses:
Robert Everett.
George W. Red.

Inventor:
Geo. W. Warren,
By J. J. Coombs,
Atty

UNITED STATES PATENT OFFICE.

GEORGE W. WARREN, OF BRISTOL, INDIANA, ASSIGNOR OF ONE-HALF TO HENRY WARREN, OF COLUMBUS, OHIO.

VEHICLE-SPRING.

SPECIFICATION forming part of Letters Patent No. 304,150, dated August 26, 1884.

Application filed May 3, 1884. (No model.)

*To all whom it may concern:*

Be it known that I, GEORGE W. WARREN, a citizen of the United States, residing at Bristol, in the county of Elkhart and State of Indiana, have invented certain new and useful Improvements in Vehicle-Springs; and I do hereby declare the following to be a full, clear, and exact description of the invention, such as will enable others skilled in the art to which it appertains to make and use the same, reference being had to the annexed drawings, forming a part thereof.

This invention is an improvement upon an invention patented to me August 1, 1882, by Letters Patent No. 262,162, for "a suspension-spring for vehicles," which is adapted to be "sprung open, instead of being closed when weighted;" and the improvement consists, essentially, in connecting the ends of the two main leaves of the spring by hinges or flexible joints, instead of rigid joints, as described and claimed in my said former patent, whereby the action of the springs in passing over uneven ground is softened, and their liability to break is diminished.

Figure 1:
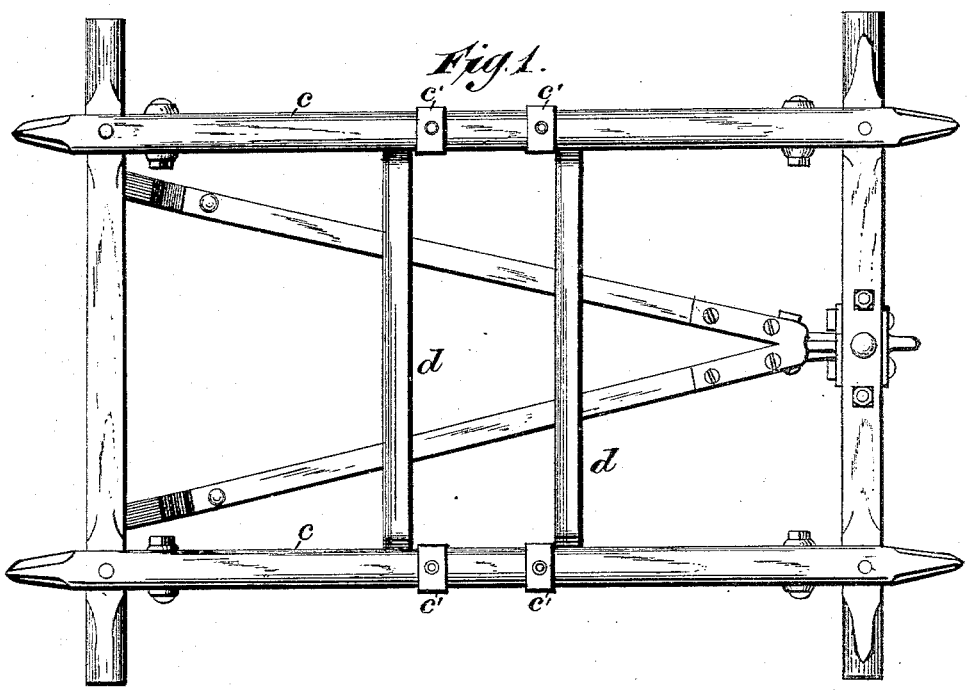
Figure 2:
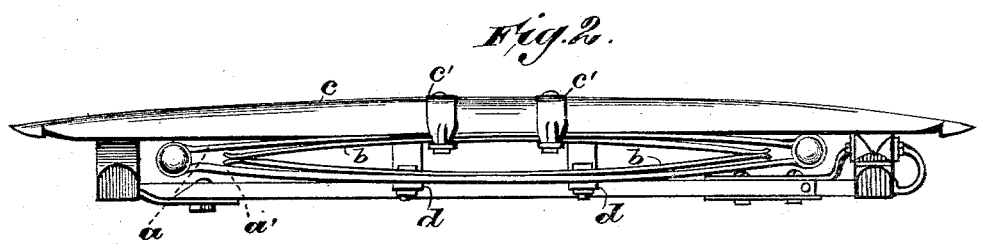
Figure 3:
Figure 4:
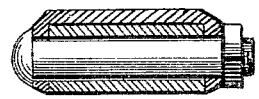

In the accompanying drawings, Figure 1 is a plan view of the running-gear of a vehicle without the wheels. Fig. 2 is a side elevation of the same; and Figs. 3 and 4 are detailed views of the hinge or flexible joint connecting the ends of the main leaves of the spring together.

The spring is formed of two main leaves, $a$ $a'$, having slight curves at their centers, and put together in the manner of an elliptical spring, except that the leaves, when not weighted, lie nearer together. These main leaves I usually re-enforce by lap-leaves $b$ $b$; but for very light vehicles this may not be necessary, and for very heavy vehicles more than one lap-leaf may be applied to each of the main leaves. The main leaves are joined together at their extremites by hinges or flexible joints (shown in detail in Fig. 3;) but I do not limit myself to this particular construction, as any form of hinge or flexible joint will answer the purpose, if having sufficient strength.

The spring is applied to use in the following manner: The upper main leaf, $a$, is secured to the under side of a sustaining-bar, $c$, or other equivalent sustaining device, by bolts or clips $c'$ $c'$, which may be arranged at any desired intervals apart, according to the degree of tension required. The ends of the springs are left free, and the bed of the vehicle is supported upon bars $d$, secured to the lower leaves of the springs or other equivalent device for causing the weight of the bed to bear directly upon the lower leaves of the springs. Thus the bed is suspended by the springs, and its weight tends to open the springs, instead of closing them, as in the case of the ordinary elliptical spring.

The said spring herein described is especially adapted to use as a side spring, but may be arranged crosswise of the vehicle, if desired.

I do not claim the hinge or flexible joint connecting the main leaves of the spring together at their ends as new or patentable in itself, but that, in combination with the other devices herein shown and described, it constitutes a new, useful, and therefore patentable combination, which is a valuable improvement upon the combination described in my said Patent No. 262,162.

I therefore claim—

A suspension vehicle-spring composed of two main leaves, the ends of which are firmly secured together by hinges or flexible joints, (with or without re-enforcing lap-leaves,) the said spring being adapted to be attached by its upper main leaf to the under side of a sustaining-bar, $a$, or its equivalent, and the lower main leaf adapted to receive the weight of the vehicle-bed directly upon it, substantially as shown and described.

In testimony whereof I affix my signature in presence of two witnesses.

GEORGE W. WARREN.

Witnesses:
 REUBEN HAMSHEN,
 C. F. MOSIER.